(12) United States Patent
Onizuka et al.

(10) Patent No.: US 9,190,850 B2
(45) Date of Patent: Nov. 17, 2015

(54) WIRELESS POWER TRANSMITTER

(75) Inventors: Kohei Onizuka, Tokyo (JP); Takeshi Ueno, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 763 days.

(21) Appl. No.: 13/342,381

(22) Filed: Jan. 3, 2012

(65) Prior Publication Data
US 2013/0002034 A1 Jan. 3, 2013

Related U.S. Application Data

(63) Continuation of application No. PCT/JP2009/066414, filed on Sep. 18, 2009.

(51) Int. Cl.
*H04B 5/00* (2006.01)
*H02J 5/00* (2006.01)
*H02J 17/00* (2006.01)

(52) U.S. Cl.
CPC ............... *H02J 5/005* (2013.01); *H02J 17/00* (2013.01); *H04B 5/00* (2013.01)

(58) Field of Classification Search
CPC ........................................................ H04B 5/00
USPC ........................................................ 307/104
See application file for complete search history.

(56) References Cited

U.S. PATENT DOCUMENTS

| | | | |
|---|---|---|---|
| 5,892,300 A * | 4/1999 | Rydval | 307/104 |
| 6,307,468 B1 * | 10/2001 | Ward, Jr. | 340/505 |
| 6,889,905 B2 | 5/2005 | Shigemasa et al. | |
| 7,049,935 B1 | 5/2006 | Wuidart et al. | |
| 7,953,369 B2 * | 5/2011 | Baarman | 455/41.1 |
| 8,050,068 B2 * | 11/2011 | Hussmann et al. | 363/97 |
| 8,116,681 B2 * | 2/2012 | Baarman | 455/41.1 |

(Continued)

FOREIGN PATENT DOCUMENTS

| | | |
|---|---|---|
| JP | 10-091694 | 4/1996 |
| JP | 2000-148932 | 5/2000 |

(Continued)

OTHER PUBLICATIONS

English-language translation of International Preliminary Report on Patentability.

(Continued)

*Primary Examiner* — Adi Amrany
(74) *Attorney, Agent, or Firm* — Nixon & Vanderhye, P.C.

(57) ABSTRACT

An example wireless power transmitter is configured for wirelessly transmitting a signal to a power receiving apparatus including a first resonance circuit and a load circuit. The first resonance circuit includes a power receiving coil and a first capacitor. The example wireless power transmitter includes a power supply that has a variable oscillation frequency and generates a signal having the oscillation frequency; a second resonance circuit that transmits the signal to the power receiving apparatus; a measuring unit that measures a signal reflection coefficient, the signal reflection coefficient being determined based on magnitude of the signal and magnitude of a signal reflected on the second resonance circuit to the power supply; and a controller that detects a value of the oscillation frequency making the signal reflection coefficient smaller than or equal to a threshold value, and calculates an electromagnetic coupling coefficient between the power transmission coil and the power receiving coil based on the detected value.

26 Claims, 4 Drawing Sheets

(56) References Cited

U.S. PATENT DOCUMENTS

| | | | |
|---|---|---|---|
| 8,446,045 B2* | 5/2013 | Smith et al. | 307/104 |
| 2009/0271047 A1* | 10/2009 | Wakamatsu | 700/295 |
| 2010/0045114 A1* | 2/2010 | Sample et al. | 307/104 |
| 2010/0052811 A1* | 3/2010 | Smith et al. | 333/33 |
| 2010/0081379 A1* | 4/2010 | Cooper et al. | 455/41.1 |
| 2010/0187913 A1* | 7/2010 | Smith et al. | 307/104 |
| 2012/0001493 A1* | 1/2012 | Kudo et al. | 307/104 |
| 2012/0112531 A1* | 5/2012 | Kesler et al. | 307/9.1 |
| 2012/0175968 A1* | 7/2012 | Katsunaga et al. | 307/104 |
| 2013/0257165 A1* | 10/2013 | Singh | 307/98 |

FOREIGN PATENT DOCUMENTS

| | | |
|---|---|---|
| JP | 2001-086030 | 3/2001 |
| JP | 2001-238372 | 8/2001 |
| JP | 2004-166384 | 6/2004 |

OTHER PUBLICATIONS

International Search Report for PCT/JP2009/066414, mailed Dec. 15, 2009.

* cited by examiner

# WIRELESS POWER TRANSMITTER

CROSS REFERENCE TO RELATED APPLICATIONS

This application is a continuation of International Application No. PCT/JP2009/066414, filed on Sep. 18, 2009, the entire contents of which are incorporated herein by reference.

FIELD

Embodiments described herein relate generally to a wireless power transmitter.

BACKGROUND

In recent years, the wireless power transmission technology is employed for many devices such as IC cards and mobile telephones. The wireless power transmission technology wirelessly and contactlessly transmits electric power using a power transmission coil and a power receiving coil. However, transmission characteristics greatly vary with positional relation between the power transmission coil and the power receiving coil. In the status quo, for example, a cradle fixes the positional relation between both coils so as to limit the distance between both coils to zero to several centimeters.

It is necessary to detect transmission characteristics depending on coil positions and adjust circuit parameters in order to ensure the transmission distance of several tens of centimeters or longer without limiting the positional relation between both coils. To do this, there is proposed a method that derives an electromagnetic coupling coefficient using the circuit sensor and the table provided for the power transmitter to adjust the tuning capacitor, improves the power transmission efficiency, and reduces heating.

However, the method aims to maximize the receiving power in a limited situation where the electromagnetic coupling coefficient approximates to 0.1. There is no known a method of ensuring high power transmission efficiency even in a wireless power transmission system that allows the electromagnetic coupling coefficient to dynamically vary from approximately 1 as an ideal coupling state to smaller than 0.001 as a very weak coupling state.

It has been difficult for the related art to ensure high power transmission efficiency in a wireless power transmission system where the electromagnetic coupling coefficient varies greatly.

DETAILED DESCRIPTION

According to one embodiment, a wireless power transmitter wirelessly transmits power to a power receiving apparatus which has a first resonance circuit and a load circuit. The first resonance circuit includes a power receiving coil and a first capacitor. The wireless power transmitter comprises a power supply that has a variable oscillation frequency and generates a signal having the oscillation frequency, a second resonance circuit that includes a power transmission coil and a second capacitor and transmits the signal to the power receiving apparatus, a measuring unit that measures a signal reflection coefficient based on magnitude of the signal and magnitude of a signal reflected on the second resonance circuit to the power supply, and a controller that assigns a plurality of values to the oscillation frequency, detects a value of the oscillation frequency making the signal reflection coefficient smaller than or equal to a specified threshold value, calculates an electromagnetic coupling coefficient between the power transmission coil and the power receiving coil based on the detected value, and controls one of the oscillation frequency and a capacitance value of the second capacitor based on the electromagnetic coupling coefficient.

Embodiments will now be explained with reference to the accompanying drawings.

First Embodiment

Figure 1:
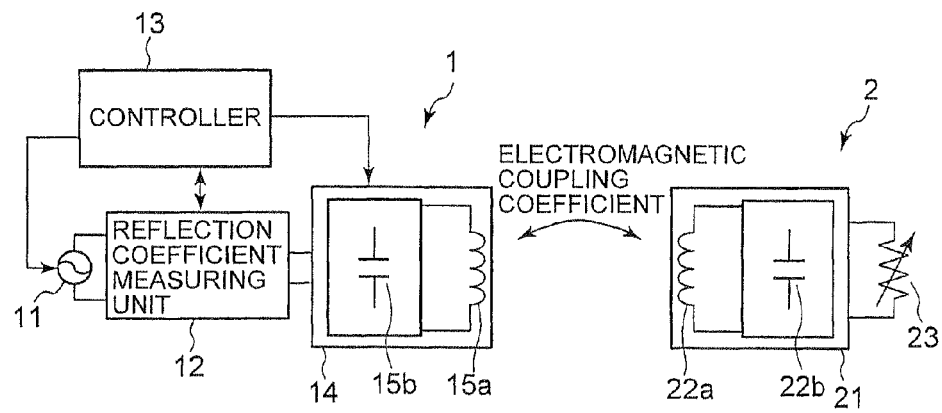
FIG. 1 is a schematic diagram illustrating a wireless power transmission system according to a first embodiment.

FIG. 1 schematically shows the configuration of a wireless power transmission system according to a first embodiment of the invention. The wireless power transmission system includes a wireless power transmitter 1 and a semiconductor device 2 that receives power (or is supplied with power) from the wireless power transmitter 1.

The wireless power transmitter 1 includes a high-frequency power source 11, a reflection coefficient measuring unit 12, a controller 13, and a resonance circuit 14. The resonance circuit 14 includes a power transmission coil 15a and a capacitor 15b. The semiconductor device 2 includes a resonance circuit 21 and a load circuit 23. The resonance circuit 21 includes a power receiving coil 22a and a capacitor 22b.

The high-frequency power source 11 generates a high-frequency signal whose frequency belongs to a radio-frequency range. The reflection coefficient measuring unit 12 measures a power reflection coefficient based on the electric power of a high-frequency signal incident on the resonance circuit 14 and the electric power of a high-frequency signal reflected from the resonance circuit 14. The reflection coefficient measuring unit 12 notifies the controller 13 of the measured power reflection coefficient. The resonance circuit 14 transmits (carries) a signal generated from the high-frequency power source 11 from the power transmission coil 15a to the semiconductor device 2.

The controller 13 can control oscillation frequencies of the high-frequency power source 11 and parameters (e.g., a capacitance value of the capacitor 15b) for the resonance circuit 14. Before transmitting the power to the semiconductor device 2, the controller 13 calculates an electromagnetic coupling coefficient between the power transmission coil 15a and the power receiving coil 22a.

Figure 2:
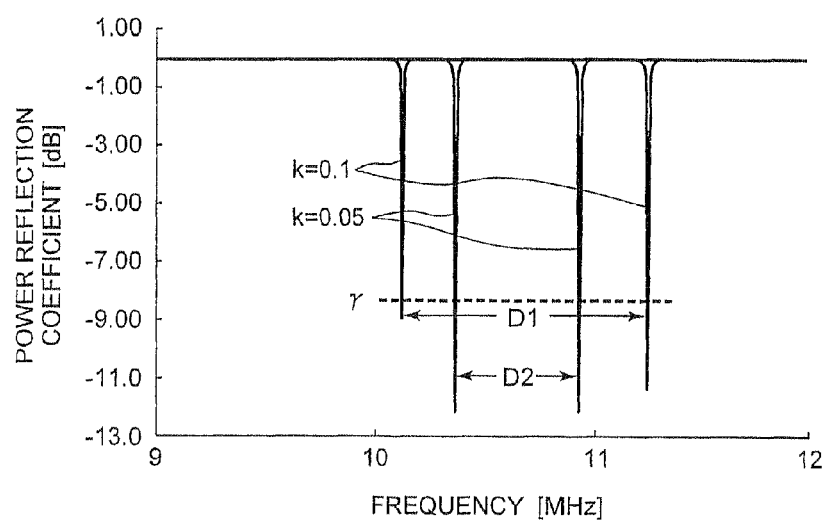
FIG. 2 is a diagram illustrating results of simulating an oscillation frequency and a power reflection coefficient.

The following describes a method of calculating the electromagnetic coupling coefficient. The controller 13 varies an oscillation frequency of the high-frequency power source 11 and assigns plural values to the oscillation frequency. The controller 13 receives power reflection coefficients for the oscillation frequencies from the reflection coefficient measuring unit 12. FIG. 2 shows results of simulating power reflection coefficients in relation to the resonance circuit 14 while varying electromagnetic coupling coefficient k and oscillation frequencies of the high-frequency power source 11 with reference to a specific transmitter parameter. FIG. 2 shows two simulation results corresponding to electromagnetic coupling coefficient k set to 0.1 and 0.05. As seen from FIG. 2, each electromagnetic coupling coefficient contains two peak frequencies, that is, frequencies each of whose power reflection coefficient corresponds to a peak value.

The peak frequency is equivalent to a function only containing the electromagnetic coupling coefficient if parameters are settled for the resonance circuit 14, the resonance circuit 21, and the load circuit 23. Accordingly, the controller 13 can uniquely calculate the electromagnetic coupling coefficient based on a difference between two peak frequencies. The embodiment previously calculates correspondence relation of a difference between two peak frequencies to the electromagnetic coupling coefficient based on various parameters settled at the design stage and stores the correspondence relation in a storage unit (not shown).

The controller 13 detects two peak frequencies each having the power reflection coefficient smaller than or equal to a specified threshold value and calculates a difference between the two peak frequencies. The controller 13 then references the correspondence relation stored in the storage unit and finds the electromagnetic coupling coefficient based on the calculated difference.

The example in FIG. 2 assumes power reflection coefficient $\gamma$ to be a threshold value. The controller 13 detects a peak frequency whose power reflection coefficient becomes smaller than or equal to threshold value $\gamma$. Difference D1 between the peak frequencies signifies that electromagnetic coupling coefficient k is 0.1. Difference D2 between the peak frequencies signifies that electromagnetic coupling coefficient k is 0.05.

The controller 13 controls the parameter (the capacitance value of the capacitor 15b) for the resonance circuit 14 and/or the oscillation frequency of the high-frequency power source 11 using parameters of the power transmission coil 15a and the power receiving coil 22a and the calculated electromagnetic coupling coefficient and starts highly efficient wireless power transmission.

The power receiving coil 22a of the semiconductor device 2 electromagnetically couples with the power transmission coil 15a to generate an inductive voltage. The load circuit 23 rectifies the generated inductive voltage. The inductive voltage is then adjusted to a specified voltage and is used as an operating voltage for the semiconductor device 2. The capacitor 22b is parallelly or serially connected to the power receiving coil 22a and resonates with self-inductance of the power receiving coil 22a to improve the transmission efficiency.

According to the embodiment, the electromagnetic coupling coefficient hardly depends on absolute measurement values for the incident power and the reflected power and can be highly accurately calculated in accordance with specified accuracy of the oscillation frequency for the high-frequency power source 11. The power transmission efficiency can be improved because the parameter of the resonance circuit 14 and/or the oscillation frequency for the high-frequency power source 11 is controlled based on the highly accurately calculated electromagnetic coupling coefficient.

The power measurement system does not require absolute accuracy. Therefore, the embodiment is easily applicable to even an electromagnetic coupling coefficient having a wide range of variations.

In the above-mentioned embodiment, the high-frequency power source 11 or a different high-frequency power source may perform actual wireless power transmission. According to the embodiment, the transmission side (wireless power transmitter 1) is provided with the high-frequency power source 11, the reflection coefficient measuring unit 12, and the controller 13 for calculating the electromagnetic coupling coefficient. Alternatively, the reception side (semiconductor device 2) may be provided with the same.

In the embodiment, a parasitic floating capacitance of the power transmission coil 15a may be used as the capacitor 15b. Similarly, the capacitor 22b may provide floating capacitance for the power receiving coil 22a.

Second Embodiment

Figure 3:
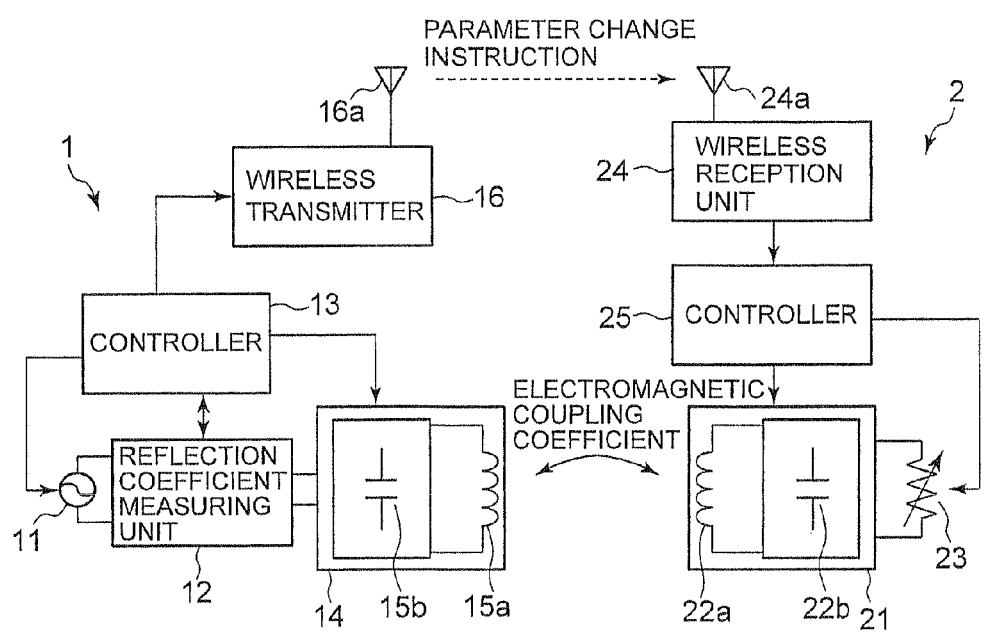
FIG. 3 is a schematic diagram illustrating a wireless power transmission system according to a second embodiment.

FIG. 3 schematically shows the configuration of a wireless power transmission system according to a second embodiment of the invention. The wireless power transmitter 1 according to the second embodiment includes a wireless transmitter 16 as an addition to the wireless power transmitter 1 according to the first embodiment shown in FIG. 1. The semiconductor device 2 according to the second embodiment includes a wireless reception unit 24 and a controller 25 as additions to the semiconductor device 2 according to the first embodiment shown in FIG. 1.

The wireless power transmission system according to the embodiment uses electromagnetic coupling between the power transmission coil and the power receiving coil. The system uniquely ensures a condition for coil terminal impedance capable of the maximum power transmission efficiency, that is, the maximum available power gain between the power transmission coil and the power receiving coil if parameters and electromagnetic coupling coefficients for the power transmission coil 15a and the power receiving coil 22a are settled. It should be noted that the coil terminal impedance is the input impedance of the power receiving coil 22a which is observed from the terminals of the capacitor 22b.

According to the embodiment, the controller 13 finds an electromagnetic coupling coefficient using the method described in the first embodiment. The controller 13 calculates a coil terminal impedance for improving the power transmission efficiency based on the calculated electromagnetic coupling coefficient and notifies the wireless transmitter 16 of the coil terminal impedance. The wireless transmitter 16 transmits the coil terminal impedance notified from the controller 13 to the wireless reception unit 24.

The wireless reception unit 24 notifies the controller 25 of the coil terminal impedance received from the wireless transmitter 16. The controller 25 changes a circuit parameter for the semiconductor device 2 so as to effectuate the notified coil terminal impedance. The controller 25 may change a parameter for the resonance circuit 21 such as a capacitance value for the capacitor 22b or a parameter for the load circuit 23 represented by a rectifier, an AC-DC converter, or a pure resistor.

The embodiment can further improve the power transmission efficiency by controlling the circuit parameter for the power receiving side (semiconductor device 2) based on the electromagnetic coupling coefficient calculated by the controller 13.

According to the second embodiment, the transmission side (wireless power transmitter 1) transmits specified coil terminal impedance (providing the maximum power transmission efficiency) to the receiving side (semiconductor device 2). Alternatively, the controller 13 may find a circuit parameter for the receiving side where the coil terminal impedance is available. The wireless transmitter 16 may transmit the circuit parameter.

Figure 4A:
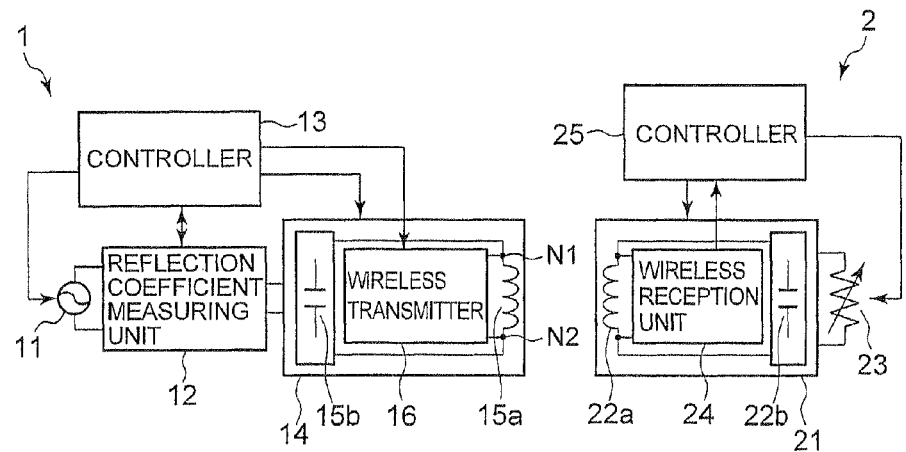
FIG. 4A is a schematic diagram illustrating a wireless power transmission system according to a modification.

According to the second embodiment, the wireless transmitter 16 transmits specified coil terminal impedance through an antenna 16a. The wireless reception unit 24 receives the coil terminal impedance via an antenna 24a. As shown in FIG. 4A, it may be preferable to use the power transmission coil 15a and the power receiving coil 22a as wireless communication antennas. The wireless transmitter 16 and the power transmission coil 15a are connected to each other at connection points (nodes) N1 and N2. The node N1 may be located at the middle of the power transmission coil 15a. The wireless transmitter 16 may be connected to the power transmission coil 15a through a single line to omit the node N2.

Figure 4B:
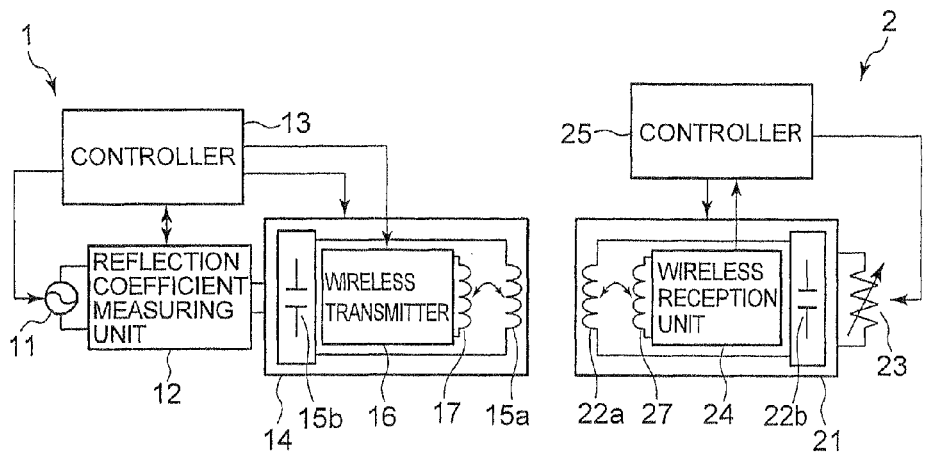
FIG. 4B is a schematic diagram illustrating a wireless power transmission system according to a modification.

As shown in FIG. 4B, the wireless transmitter 16 and the wireless reception unit 24 may include coils 17 and 27, respectively, for electromagnetic coupling between the power transmission coil 15a and the power receiving coil 22a.

Third Embodiment

A wireless power transmission system according to a third embodiment of the invention has the same configuration as that of the wireless power transmission system according to the second embodiment shown in FIG. 3. The following description references FIG. 3.

According to the embodiment, the controller 13 calculates a parameter for the resonance circuit 14 and/or 21 at the stage of calculating the electromagnetic coupling coefficient before power transmission so that a frequency (peak frequency shown in FIG. 2) specific to power reflection characteristics appears in a given frequency range. The parameter for the resonance circuit is equivalent to a capacitance value of the capacitor, for example.

The controller 13 changes the parameter for the resonance circuit 14 based on the calculation result. The parameter calculated by the controller 13 for the resonance circuit 21 is transmitted to the controller 25 through the wireless communication apparatuses (wireless transmitter 16 and wireless reception unit 24). The controller 25 changes the parameter for the resonance circuit 21 based on the received parameter.

The embodiment can narrow the range of occurrence of the peak frequency for the power reflection coefficient and thereby narrow the range of a high-frequency power source oscillation frequency to be varied for calculation of the electromagnetic coupling coefficient. The electromagnetic coupling coefficient can be found promptly.

Fourth Embodiment

A wireless power transmission system according to a fourth embodiment of the invention has the same configuration as that of the wireless power transmission system according to the second embodiment shown in FIG. 3. The following description references FIG. 3.

According to the embodiment, the controller 13 instructs the controller 25 to change the parameter for the load circuit 23 at the stage of calculating the electromagnetic coupling coefficient before power transmission through the wireless communication apparatuses (wireless transmitter 16 and wireless reception unit 24) so that a frequency (peak frequency shown in FIG. 2) specific to power reflection characteristics sharply peaks. The controller 25 changes the parameter for the load circuit 23 based on the instruction from the controller 13.

Specifically, the controller 13 instructs the controller 25 to adjust a resistance value of the load circuit 23 to be sufficiently smaller than the parasitic resistance of the power receiving coil 22a or to be sufficiently larger than the impedance estimated from the load circuit 23 to the resonance circuit 21. As a result, the Q value for the entire resonance system increases to sharpen the peak of power reflection characteristics (narrow the half width of the power reflection coefficient).

The embodiment can increase the peak frequency read accuracy by sharpening the peak of power reflection characteristics. The embodiment can further improve the accuracy of calculating the electromagnetic coupling coefficient.

Fifth Embodiment

Figure 5:
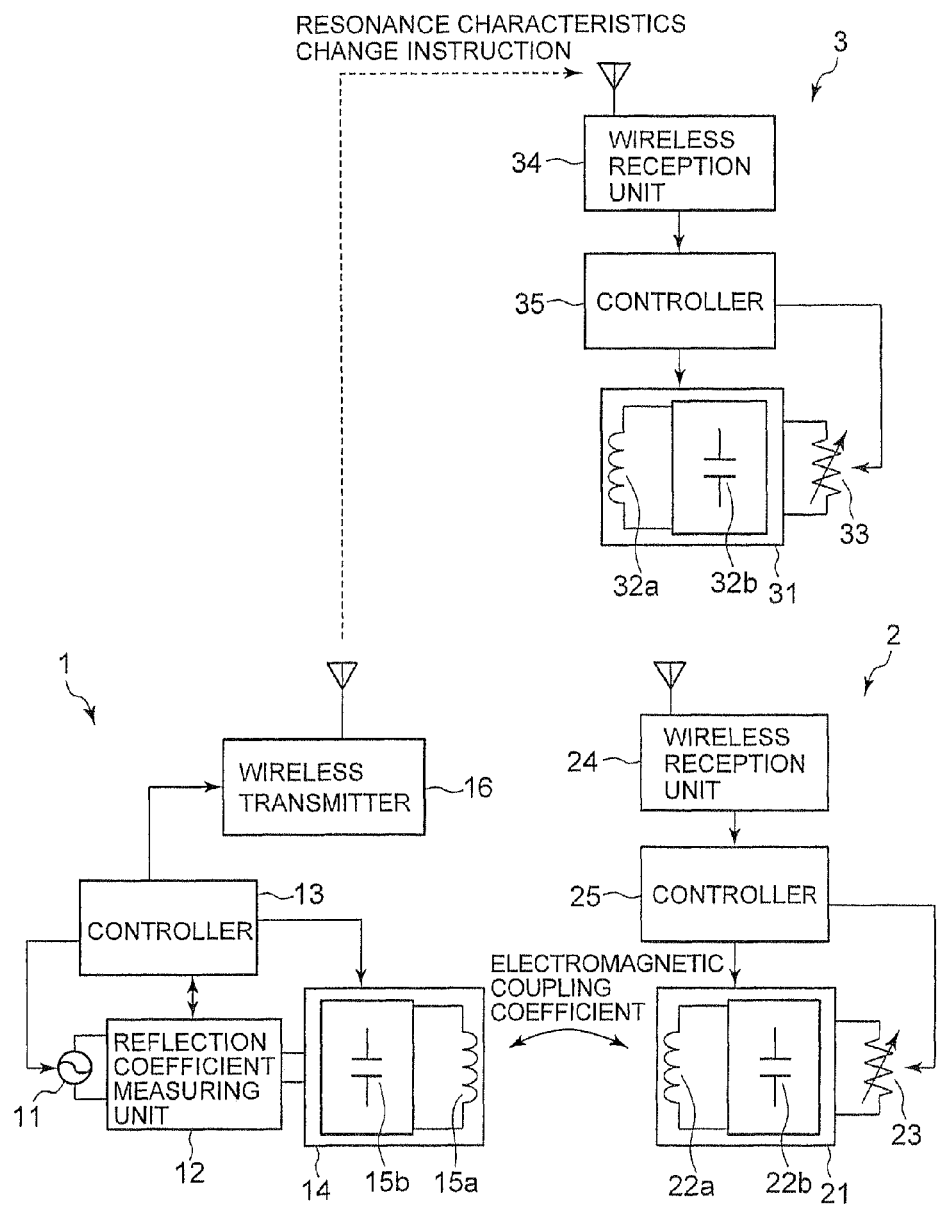
FIG. 5 is a schematic diagram illustrating a wireless power transmission system according to a fifth embodiment.

FIG. 5 schematically shows the configuration of a wireless power transmission system according to a fifth embodiment of the invention. The wireless power transmission system according to the fifth embodiment includes a semiconductor device 3 as an addition to the wireless power transmission system according to the second embodiment shown in FIG. 3. The semiconductor device 3 includes a resonance circuit 31, a load circuit 33, a wireless reception unit 34, and a controller 35. The resonance circuit 31 includes a power receiving coil 32a and a capacitor 32b. The semiconductor device 3 is configured equally to the semiconductor device 2.

The semiconductor device 3 is provided near a pair of power transmission/receiving apparatuses (wireless power transmitter 1 and semiconductor device 2) that measure the electromagnetic coupling coefficient for highly efficient power transmission. The semiconductor device 3 is independent of actual power transmission. It is difficult to accurately calculate the electromagnetic coupling coefficient between the power transmission/receiving apparatuses if the semiconductor device 3 has resonance characteristics similar to those of the power transmission/receiving apparatuses.

To solve this problem, the controller 13 of the wireless power transmitter 1 according to the embodiment instructs the controller 35 through the wireless communication apparatuses (wireless transmitter 16 and wireless reception unit 34) to control the resonance frequency for the semiconductor device 3 so as to be sufficiently different from the resonance frequencies for the pair of power transmission/receiving apparatuses. Specifically, the controller 13 instructs the controller 35 to change the capacitance value or the inductance value for the resonance circuit 32 or short-circuit or open a switch (not shown) provided for the coil 32a.

Changing resonance characteristics for the semiconductor device 3 can highly accurately calculate the electromagnetic coupling coefficient between the wireless power transmitter 1 and the semiconductor device 2.

The above-mentioned embodiment assumes that the reflection coefficient measuring unit 12 measures the power reflection coefficient. The reflection coefficient measuring unit 12 may measure the other signal reflection coefficients such as a voltage reflection coefficient and a current reflection coefficient based on the current or the voltage of a signal applied to the resonance circuit 14 from the high-frequency power source 11 and based on the current or the voltage of a signal reflected from the resonance circuit 14. Similarly to the power reflection coefficient, the voltage reflection coefficient and the current reflection coefficient contain a peak frequency corresponding to the electromagnetic coupling coefficient as shown in FIG. 2. Consequently, the controller 13 can calculate the electromagnetic coupling coefficient between the power transmission coil 15a and the power receiving coil 22a from peak frequencies for the voltage reflection coefficient or the current reflection coefficient (frequency difference between two peak frequencies). In this context, a signal is assumed to transmit power from the wireless power transmitter 1 to the semiconductor device 2 and need not contain information such as data.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless power transmitter for wirelessly transmitting a signal to a power receiving apparatus having a first resonance circuit and a load circuit, wherein the first resonance circuit includes a power receiving coil and a first capacitor, the wireless power transmitter comprising:
   a power supply that has a variable oscillation frequency and generates signals;
   a second resonance circuit that transmits the signals to the power receiving apparatus;
   a measuring unit that measures signal reflection coefficients associated with respective ones of the generated signals; and
   a controller that controls one or both of the oscillation frequency and a parameter of the second resonance circuit based on a calculated electromagnetic coupling coefficient between the power transmission coil and the power receiving coil, the electromagnetic coupling coefficient being calculated, before transmitting signals for powering the load circuit, by at least controlling the power supply to generate signals each having a respective oscillation frequency; controlling the measuring unit to measure signal reflection coefficients, each signal reflection coefficient being determined based on magnitude of one of the signals and magnitude of a corresponding signal reflected on the second resonance circuit to the power supply; detecting a value of the oscillation frequency making the signal reflection coefficient smaller than or equal to a threshold value; and calculating the electromagnetic coupling coefficient based on the detected value.

2. The wireless power transmitter according to claim 1, further comprising:
   a transmitter that transmits a first control signal to the power receiving apparatus so that the first control signal indicates change of a capacitance value for the first capacitor and/or a parameter for the load circuit, wherein the controller generates the first control signal based on the electromagnetic coupling coefficient.

3. The wireless power transmitter according to claim 2, wherein the controller controls a capacitance value for the first capacitor so that a frequency range includes the oscillation frequency making the signal reflection coefficient smaller than or equal to the threshold value.

4. The wireless power transmitter according to claim 3, wherein the controller controls a parameter for the load circuit so as to increase a difference between a maximum value and a minimum value for the signal reflection coefficient.

5. The wireless power transmitter according to claim 2, wherein the controller controls resonance characteristics of a semiconductor device to be different from resonance characteristics of the wireless power transmitter and the power receiving apparatus, the semiconductor device having a third resonance circuit and a second load circuit, the third resonance circuit being provided with a coil and a capacitor.

6. The wireless power transmitter according to claim 5, wherein the controller changes an inductance value for the coil of the third resonance circuit or a capacitance value for the capacitor of the third resonance circuit.

7. The wireless power transmitter according to claim 5, wherein the controller short-circuits or opens a switch provided for the coil of the third resonance circuit.

8. The wireless power transmitter according to claim 1, wherein the controller controls the oscillation frequency based on the electromagnetic coupling coefficient.

9. The wireless power transmitter according to claim 1, wherein the second resonance circuit includes a power transmission coil and a second capacitor.

10. The wireless power transmitter according to claim 9, wherein the controller controls a capacitance value of the second capacitor based on the electromagnetic coupling coefficient.

11. The wireless power transmitter according to claim 10, wherein the controller controls a capacitance value for the second capacitor so that a frequency range includes the oscillation frequency making the signal reflection coefficient smaller than or equal to the threshold value.

12. The wireless power transmitter according to claim 11, wherein the controller controls a parameter for the load circuit so as to increase a difference between a maximum value and a minimum value for the signal reflection coefficient.

13. The wireless power transmitter according to claim 1, wherein the controller detects two values of the oscillation frequency making the signal reflection coefficient smaller than or equal to the threshold value, and calculates the electromagnetic coupling coefficient based on a difference between the two values.

14. The wireless power transmitter according to claim 13, further comprising:
   storage that stores a previously calculated correspondence relation of the difference between the two values to the electromagnetic coupling coefficient,
   wherein the controller references the correspondence relation stored in the storage based on the difference between the two values to calculate the electromagnetic coupling coefficient.

15. The wireless power transmitter according to claim 1, wherein the controller detects the value of the oscillation frequency making the signal reflection coefficient be a peak value, and calculates the electromagnetic coupling coefficient based on the detected value.

16. The wireless power transmitter according to claim 1, wherein the controller detects the value of the oscillation frequency making the signal reflection coefficient be a local minimal value, and calculates the electromagnetic coupling coefficient based on the detected value.

17. A wireless power transmission controlling method for a wireless power transmitter comprising a power supply having a variable oscillation frequency and a resonance circuit including a coil and a capacitor, the method comprising:
   controlling either one or both of the oscillation frequency and a capacitance value of the capacitor based on a calculated electromagnetic coupling coefficient, the electromagnetic coupling coefficient being calculated before transmitting signals for powering a load circuit by at least
   generating, by the power supply, signals each having a respective oscillation frequency;

measuring signal reflection coefficients, each signal reflection coefficient being determined based on magnitude of one of the signals and magnitude of a corresponding signal reflected on the resonance circuit to the power supply;

detecting a value of the oscillation frequency making the signal reflection coefficient smaller than or equal to a threshold value; and calculating the electromagnetic coupling coefficient based on the detected value.

18. The method according to claim 17, wherein two values of the oscillation frequency making the signal reflection coefficient smaller than or equal to the threshold value are detected, and the electromagnetic coupling coefficient of the coil is calculated based on a difference between the two values.

19. The method according to claim 18, further comprising:

referencing a previously calculated correspondence relation of the difference between the two values to the electromagnetic coupling coefficient to calculate the electromagnetic coupling coefficient.

20. The method according to claim 17, wherein the value of the oscillation frequency making the signal reflection coefficient be a peak value is detected, and the electromagnetic coupling coefficient is calculated based on the detected value.

21. The method according to claim 17, wherein the value of the oscillation frequency making the signal reflection coefficient be a local minimal value is detected, and the electromagnetic coupling coefficient is calculated based on the detected value.

22. A power receiving apparatus for wirelessly transmitting a signal to a wireless power transmitter having a first resonance circuit, wherein the first resonance circuit includes a power transmission coil and a first capacitor, the power receiving apparatus comprising:

a power supply that has a variable oscillation frequency and generates signals;

a second resonance circuit that includes a power receiving coil and a second capacitor and transmits the signals to the wireless power transmitter;

a measuring unit that measures signal reflection coefficients associated with respective ones of the generated signals; and a controller that controls one or both of the oscillation frequency and a parameter of the second resonance circuit based on a calculated electromagnetic coupling coefficient between the power transmission coil and the power receiving coil, the electromagnetic coupling coefficient being calculated, before the wireless power transmitter transmits signals for powering a load circuit of the power receiving apparatus, by at least controlling the power supply to generate signals each having a respective oscillation frequency; controlling the measuring unit to measure signal reflection coefficients, each signal reflection coefficient being determined based on magnitude of one of the signals and magnitude of a corresponding signal reflected on the second resonance circuit to the power supply; detecting a value of the oscillation frequency making the signal reflection coefficient smaller than or equal to a threshold value; calculating the electromagnetic coupling coefficient based on the detected value; and controlling either one or both of an oscillation frequency and a capacitance value of the second capacitor based on the electromagnetic coupling coefficient.

23. The apparatus according to claim 22, wherein the controller detects two values of the oscillation frequency making the signal reflection coefficient smaller than or equal to the threshold value, and calculates the electromagnetic coupling coefficient based on a difference between the two values.

24. The apparatus according to claim 23, further comprising:

storage that stores a previously calculated correspondence relation of the difference between the two values to the electromagnetic coupling coefficient, wherein the controller references the correspondence relation stored in the storage based on the difference between the two values to calculate the electromagnetic coupling coefficient.

25. The apparatus according to claim 22, wherein the controller detects the value of the oscillation frequency making the signal reflection coefficient be a peak value, and calculates the electromagnetic coupling coefficient based on the detected value.

26. The apparatus according to claim 22, wherein the controller detects the value of the oscillation frequency making the signal reflection coefficient be a local minimal value, and calculates the electromagnetic coupling coefficient based on the detected value.

\* \* \* \* \*